US012767880B2

(12) United States Patent
AlTammar et al.

(10) Patent No.: US 12,767,880 B2
(45) Date of Patent: Oct. 20, 2026

(54) CLATHRATES FOR SUBSURFACE STIMULATION AND SEQUESTRATION

(71) Applicant: Saudi Arabian Oil Company, Dhahran (SA)

(72) Inventors: Murtadha J. AlTammar, Dhahran (SA); Rima Taqi Alfaraj, Al Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 19/174,615

(22) Filed: Apr. 9, 2025

(65) Prior Publication Data

US 2026/0317619 A1 Oct. 15, 2026

(51) Int. Cl.

*E21B 41/00* (2006.01)
*C09K 8/68* (2006.01)
*C09K 8/70* (2006.01)
*E21B 43/26* (2006.01)

(52) U.S. Cl.

CPC ................ *C09K 8/703* (2013.01); *C09K 8/68* (2013.01); *C09K 8/706* (2013.01); *E21B 41/0064* (2013.01); *E21B 43/26* (2013.01); *C09K 2208/10* (2013.01)

(58) Field of Classification Search

None

See application file for complete search history.

(56) References Cited

U.S. PATENT DOCUMENTS 10,294,410 B2 5/2019 McDaniel et al.
2014/0256599 A1* 9/2014 Kelland ................. C09K 8/528 507/90
2014/0262265 A1* 9/2014 Hutchins ............... E21B 43/267 166/305.1
2017/0066959 A1 3/2017 Hull et al.
2023/0358119 A1 11/2023 Lau et al.

FOREIGN PATENT DOCUMENTS

WO WO 2018151907 A1 8/2018
WO WO 2024030435 A1 2/2024

OTHER PUBLICATIONS

Duxbury et al., “Permanent Sequestration of Emitted Gases in the Form of Clathrate Hydrates,” NASA Tech Brief, Feb. 2004, 2 pages.
Hull et al., “Chemomechanical effects of oxidizer-CO2 systems upon hydraulically fractured unconventional source rock,” The Canadian Journal of Chemical Engineering, 2021, 100(6):1417-1426, 26 pages.
Hull et al., “Oxidative kerogen degradation: a potential approach to hydraulic fracturing in unconventionals,” Energy & Fuels, May 2019, 33(6):4758-4766, 11 pages.

(Continued)

*Primary Examiner* — Andrew Sue-Ako

(74) *Attorney, Agent, or Firm* — Fish & Richardson P.C.

(57) ABSTRACT

A method placing carbon dioxide in a subterranean zone includes disposing into a wellbore drilled into a subterranean zone a mixture comprising guanidinium-based clathrate particles, and flowing the mixture downhole through the wellbore and thence into the subterranean zone, thereby placing in the subterranean zone carbon dioxide released from decomposition of the clathrate.

11 Claims, 3 Drawing Sheets

(56) References Cited

OTHER PUBLICATIONS

Prashant et al., "Subsurface CO2 storage through clathrate hydrate formation," Advances in the Geological Storage of Carbon Dioxide, Dec. 2006, 16 pages.
Xiang et al., "Synthesis of stable single-crystalline carbon dioxide clathrate powder by pressure swing crystallization," Cell Reports Physical Science, May 2023, 4(5):101383, 15 pages.
Zheng et al., "A Nanoparticle Assisted CO2 Huff-N-Puff Field Test in the Eagle Ford Shale," presented at the SPE Improved Oil Recovery Conference, held virtually, Aug. 31-Sep. 4, 2020, 17 pages.
Wang et al., "High purity carbon dioxide captured with guanidinium sulfate clathrate from carbon dioxide/hydrogen mixtures," Fluid Phase Equilibria, May 2025, 592:114336, 9 pages.
International Search Report and Written Opinion in International Appln. No. PCT/US2026/023081, mailed on Aug. 31, 2026, 15 pages.

* cited by examiner

CLATHRATES FOR SUBSURFACE STIMULATION AND SEQUESTRATION

TECHNICAL FIELD

This disclosure relates to well operations, and in particular to operations for placing carbon dioxide into geological formations for purposes of, for example, hydraulic fracturing or subsurface carbon dioxide sequestration.

BACKGROUND

Hydraulic fracturing is a process of stimulating a well to increase production of oil, gas, or other fluids from rock formations. The process involves high-pressure injection of a fracturing fluid into a wellbore to create fractures, so that fluids can flow more freely through the rock formation. Hydraulic fracturing can increase the mobility of trapped hydrocarbons and therefore increase recovery of hydrocarbons from a reservoir. Fracturing fluid (and other fluids flowed into a reservoir as part of fracturing operations) can include aqueous or non-aqueous base fluids with other components such as proppants and oxidants.

Carbon dioxide can be utilized as a component of a fracturing fluids or other fluid mixtures placed into the subterranean zone, and such use of carbon dioxide can provide many advantages. For example, carbon dioxide adsorption can induce swelling and dilation of the shale matrix, increasing porosity and permeability for improved hydrocarbon flow. The carbon dioxide can also displace adsorbed hydrocarbons from the shale pore surfaces, enhancing their recovery. Carbon dioxide can also mix with lighter hydrocarbons present in the shale, improving their displacement and recovery through miscible flooding mechanisms.

Injection or other placement of carbon dioxide into a subterranean zone can also be done as part of carbon dioxide sequestration operations, either in conjunction with hydraulic fracturing or as a separate process unrelated to hydraulic fracturing operations. As anthropogenic carbon dioxide emissions continue to rise steadily, technologies for capturing and storing carbon dioxide will be critical to achieving the global climate change mitigation goals. Subterranean geological sequestration of carbon dioxide may be of particular interest due to the potential large storage capacity of geological formations and the permanence of such sequestration.

SUMMARY

Certain aspects of the subject matter herein can be implemented as a method for well operations for placing carbon dioxide in a subterranean zone, for, for example, fracturing (or other well stimulation) or sequestration. The method includes disposing into a wellbore drilled into a subterranean zone a mixture comprising guanidinium-based clathrate particles, and flowing the mixture downhole through the wellbore and thence into the subterranean zone, thereby placing in the subterranean zone carbon dioxide released from decomposition of the clathrate.

Certain aspects of the subject matter herein can be implemented as a fracturing slurry. The fracturing slurring includes a fluid configured for hydraulic fracturing of a subterranean zone and guanidinium-based clathrate particles.

The details of one or more embodiments are set forth in the accompanying drawings and the description below. Other features, objects, and advantages will be apparent from the description and drawings, and from the claims.

DETAILED DESCRIPTION

The capture, transport, and subterranean injection of carbon dioxide for (for example) hydraulic fracturing or subsurface sequestration presents many technical and economic challenges. For example, if the carbon dioxide for such operations is compressed or liquified, special transportation and handling equipment is required. Such equipment can be costly to operate and any failure of such equipment can present operational, safety, or environmental hazards.

In accordance with embodiments of the present disclosure, some or all of these problems and challenges associated with such operations can be reduced or eliminated by utilization of guanidinium-based carbon dioxide clathrate ($CO_2$@$Gua_2SO_4$) as a medium in which carbon dioxide is captured from industrial sources (or other sources), transported to a wellsite, and injected into a subterranean zone. $CO_2$@$Gua_2SO_4$ particles can be can be formed through co-crystallization of carbon dioxide with guanidinium sulfate. The guanidinium sulfate serves to organize and trap the carbon dioxide molecules without reacting with them. When formed, $CO_2$@$Gua_2SO_4$ exists as solid particles that are stable and non-corrosive at ambient temperature and pressure. Techniques for $CO_2$@$Gua_2SO_4$ formation are described in, for example, Xiang et al., *Synthesis of Stable Single-Crystalline Carbon Dioxide Clathrate Powder by Pressure Swing Crystallization*, Cell Reports Physical Science 4, 101383 (May 17, 2023), the contents of which are hereby incorporated by reference. With a carbon dioxide loading of 17 wt % and density of 0.252 g/cm$^3$, the clathrate enables compact solid-state storage and transportation of captured carbon dioxide. The clathrate formation can occur under mild temperature and pressure conditions, minimizing energy requirements. The non-volatile, non-corrosive nature of the stabilized clathrate powder eliminates hazards associated with pressurized gas cylinders or corrosive liquid amine solvents. As such, $CO_2$@$Gua_2SO_4$ can capture—in a solid, stable form—significant volumes of anthropogenic carbon dioxide. Furthermore, carbon dioxide capture in $CO_2$@$Gua_2SO_4$ is reversible, in that $CO_2$@$Gua_2SO_4$ particles decompose (structurally collapse) when placed in an aqueous solution, releasing the trapped carbon dioxide. Thus, $CO_2$@$Gua_2SO_4$ can serve as a mechanism by which carbon dioxide is captured at a surface source, trapped within solid clathrate particles, and then transported and injected into geological formations in subterranean zones, such that the carbon dioxide from the decomposition is placed within the formations.

Figure 1:
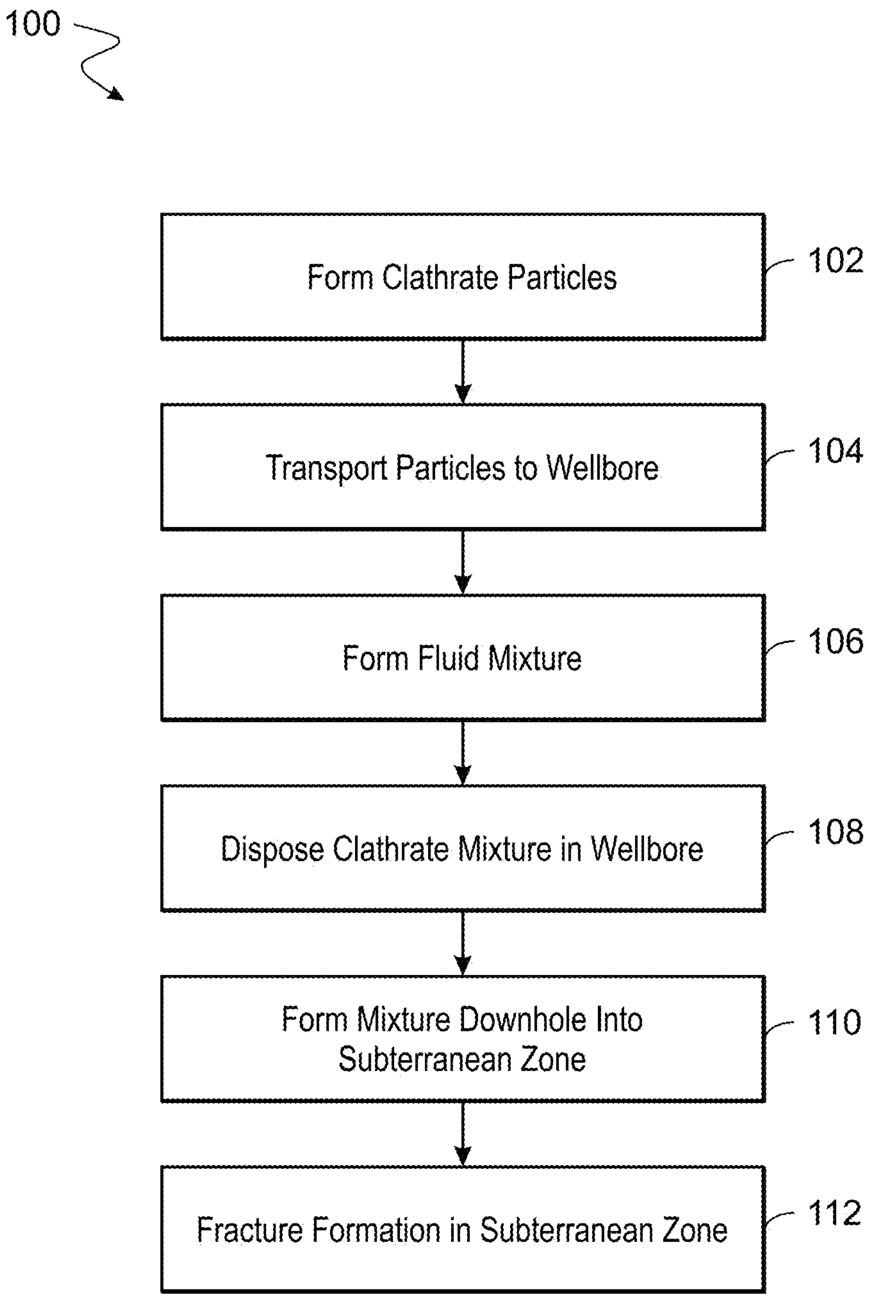
FIG. 1 is a process flow diagram of a method for placing carbon dioxide in a subterranean zone in accordance with embodiments of the present disclosure.

FIG. 1 is a process flow diagram of a method 100 for placing carbon dioxide into a subterranean zone from a wellsite, in accordance with embodiments of the present disclosure. The method begins at step 102, in which $CO_2$@$Gua_2SO_4$ particles are formed, trapping within their crystalline structure carbon dioxide molecules. The formation of the $CO_2$@$Gua_2SO_4$ particles can occur at a particle manufacturing facility that is part of, for example, a gas plant or other industrial source of anthropogenic carbon dioxide. Alternatively (or in addition), such a facility can be located at or near the wellsite, as part of the wellsite surface equipment. At step 104, $CO_2$@$Gua_2SO_4$ particles are transported to the wellsite (unless already present at the wellsite). Such transportation can be via road, rail, or other suitable conveyance. Due to temperature and pressure sensitivity of $CO_2$@$Gua_2SO_4$ storage and transportation tanks may require controlled environmental conditions (e.g., refrigeration or pressurization).

Proceeding to step 106, a mixture of a base fluid and $CO_2$@$Gua_2SO_4$ particles is formed. Such mixture can be, for example, a slickwater fracturing slurry or other mixture suitable for stimulation operations in an organic-rich shale formation, or can be another mixture suitable for other wellbore operations related to stimulation or sequestration. A fracturing slurry can comprise, for example, $CO_2$@$Gua_2SO_4$ particles in a fluid configured for hydraulic fracturing operations. A fluid configured for hydraulic fracturing operations can comprising an aqueous base fluid, proppants (such as sand), and additives such as friction reducers (such as polycrylamide), oxidizers, tracers (such as sodium chloride), clay stabilizers, hydrochloric acid, viscosifiers, gelling agents, and biocides (such as glutaraldehyde). In some embodiments the base fluid can be a non-aqueous base fluid such as nitrogen or an oil-based fluid. Proceeding to step 108, the mixture is disposed in a wellbore. The wellbore can be, for example, part of a fracture treatments system such as system 310 as described in reference to FIG. 3. Proceeding to step 110, the mixture is pumped or otherwise flowed downhole through the wellbore. As the $CO_2$@$Gua_2SO_4$ flows downhole and comes in contact with aqueous fluids such as natural formation water or aqueous fracturing fluids at downhole temperatures (for example, 100 degrees Celsius or more), the $CO_2$@$Gua_2SO_4$ decomposes, releasing the trapped carbon dioxide such that the released carbon dioxide is placed into the subterranean zone. In the embodiment of FIG. 1 in which the process is in connected with fracturing operations, the rock formation of the subterranean zone is fractured at step 112 by applying hydraulic pressure, with a system such as that described in FIG. 3. In some embodiments, such as a stand-alone sequestration operation unrelated to fracturing, step 112 may be omitted and the final step may include permanent sequestration of the carbon dioxide (possibly including, for example, permanent closure of the wellbore).

Figure 2:
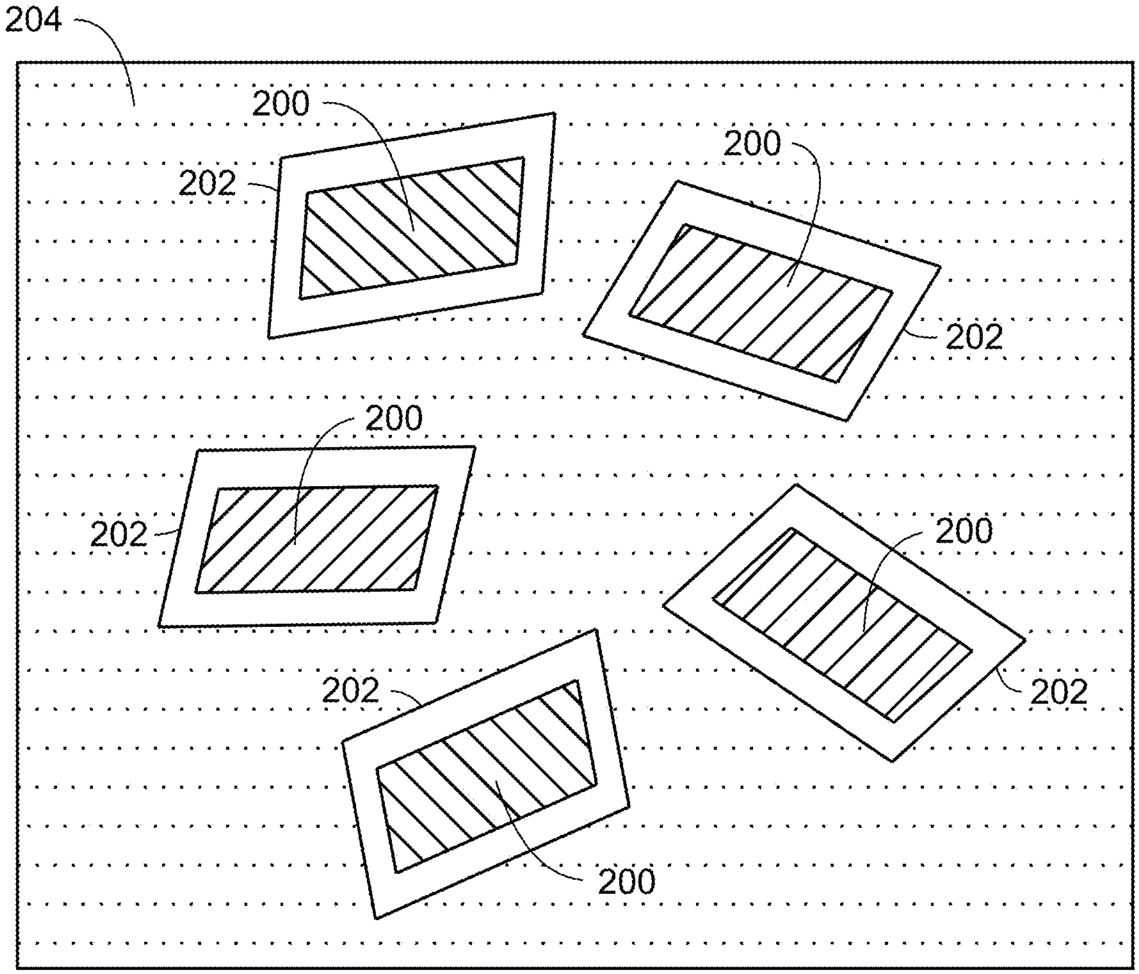
FIG. 2 is schematic illustration of encapsulated clathrate particles in accordance with embodiments of the present disclosure.

Referring to FIG. 2, in some embodiments, prior to forming the fluid mixture, $CO_2$@$Gua_2SO_4$ particles (shown as particles 200 in FIG. 2) can be encapsulated with a barrier 202 such as an external coating that is at least partially impermeable to the surrounding fluids 204, thus acting to stabilize the particles against premature decomposition. The coating can be (or can include), for example, a polymer such as polyvinyl alcohol (PVA), polylactic acid (PLA), or polyethylene glycol (PEG). In some embodiments, the coating could be a polymer-nanoparticle composite such as silica-reinforced polymers, which can have high mechanical strength and thermal stability. In some embodiments, the coating can be a wax or resin such as paraffin or epoxy-based coatings. The encapsulant can shield against environmental factors (temperature and dissolution) and also allow for controlled decomposition under targeted conditions (e.g., releasing carbon dioxide only upon reaching a specific downhole pressure or temperature). In some embodiments, effective encapsulation can resist melting and withstand temperatures typical of downhole environments (for example, up to 150° C. for deep wells) and resist dissolution by being impermeable to water for a specified duration (for example, until particles reach the target zone). Encapsulation can also aid in maintaining structural integrity of the particles by having sufficient thickness (e.g., microns or millimeters) to avoid mechanical failure during pumping.

The encapsulating process can occur as part of the particle formation process or after particle formation to avoid disrupting the clathrate structure and providing for better adhesion and uniform coverage. Techniques for encapsulation can include spray coating, in which the particles can be coated using spray-drying or atomization techniques. Microencapsulation: Particles can be embedded by microencapsulation within a polymer matrix using emulsion or phase separation methods. For larger particles, techniques like fluidized bed coating may be used to apply successive encapsulant layers. In some embodiments, each individual clathrate particle would have its own encapsulating layer to maximize protection. Aggregated "clumps" could be encapsulated but may risk uneven protection or premature decomposition. A further advantage of such a coating is that it protects the particles after manufacture and during transport. Testing can be incorporated into the manufacturing process to ensure that encapsulated particles can withstand shear forces and pressure changes during injection.

In some embodiments, instead of or in addition to an external coating or other physical barrier, the process of forming clathrate particles include stabilizing steps or agents to enhance the crystallographic stability of the clathrate. For example, the clathrate structure can be doped with additional stabilizing ions, such as potassium ($K^+$) or calcium ($Ca^{2+}$), which can strengthen the crystallographic lattice and reduce premature decomposition. Chemical stabilizers such as organic ligands (for example, amino acids or polyethylene glycol) can be introduced during clathrate formation to reinforce hydrogen bonding in the crystal structure. Encapsulation within a polymeric matrix (e.g., polyvinyl alcohol or chitosan) can help maintain the integrity of the clathrate particles under varying environmental conditions. In some embodiments, a surfactant-mediated stabilization using amphiphilic molecules such as sodium dodecyl sulfate (SDS) can aid in maintaining particle stability in aqueous suspensions.

Figure 3:
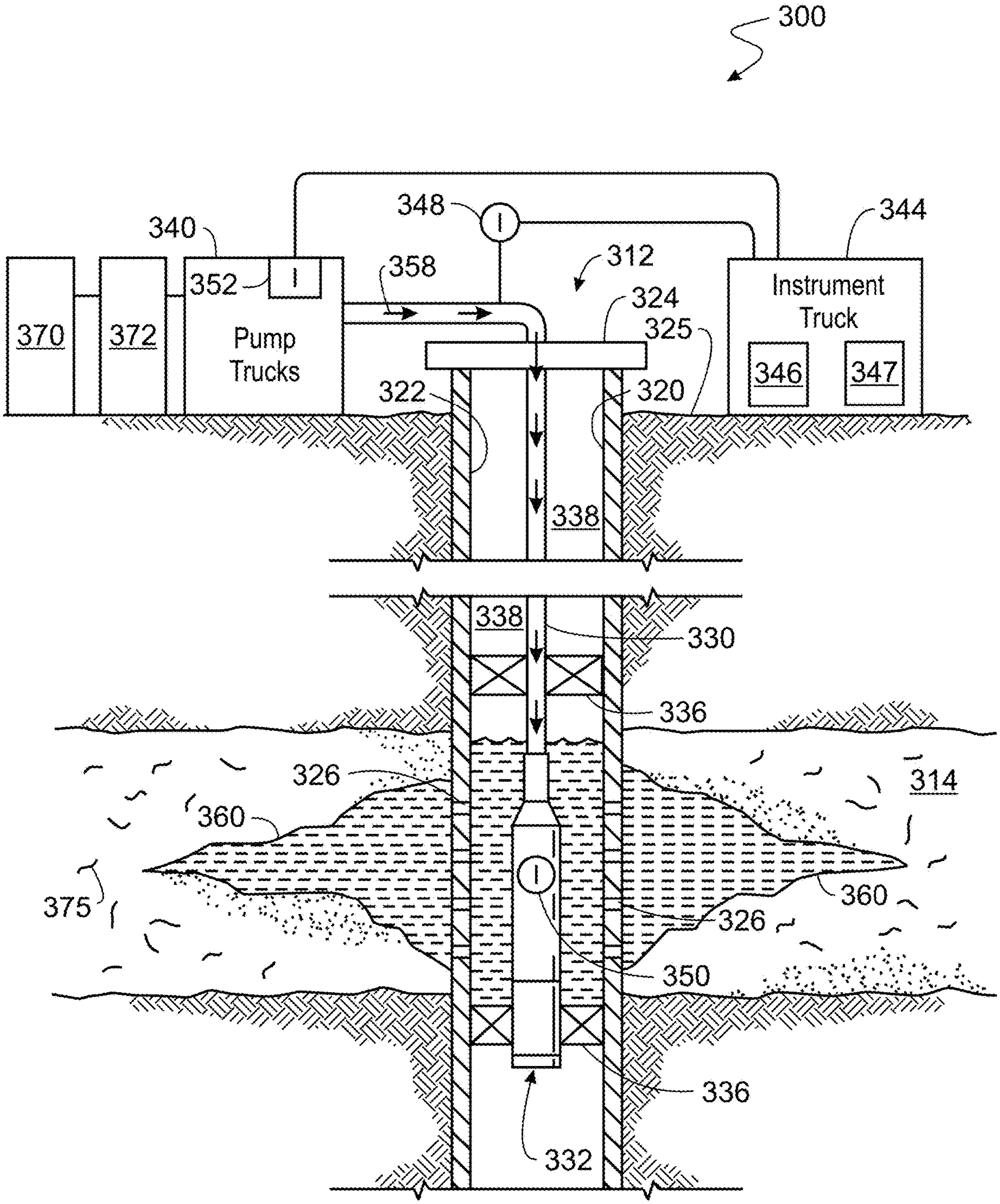
FIG. 3 is a schematic illustration of a well fracture treatment system in accordance with embodiments of the present disclosure.

FIG. 3 illustrates an example of a fracture treatment system 310 for a well 312 drilled into a subterranean zone 314 from a terranean surface 325, in accordance with embodiments of the present disclosure. The subterranean zone 314 can be a reservoir or other geological formation, for example, an unconventional reservoir in which recovery operations in addition to conventional recovery operations are practiced to recover trapped hydrocarbons. Examples of unconventional reservoirs include tight-gas sands, gas and oil shales, coalbed methane, heavy oil and tar sands, and gas-hydrate deposits. In some implementations, subterranean zone 314 includes an underground formation of naturally fractured rock containing hydrocarbons (for example, oil, gas, or both). For example, subterranean zone 314 can include a fractured shale. In some implementations, the well 312 can intersect other suitable types of formations within subterranean zone 314, including reservoirs that are not naturally fractured in any significant amount.

The well 312 can include a well bore 320, casing 322 and well head 324 at surface 325. The well bore 320 can be a vertical or deviated bore. The casing 322 can be cemented or otherwise suitably secured in the well bore 312. Perforations 326 can be formed in the casing 322 at the level of the subterranean zone 314 to allow oil, gas, and by-products to flow into the well 312 and be produced to the surface 325. Perforations 326 can be formed using shape charges, a perforating gun or otherwise.

For the fracture treatment system 310, a work string 330 can be disposed in the well bore 320. The work string 330 can be coiled tubing, sectioned pipe or other suitable tubing. A fracturing tool 332 can be coupled to an end of the work string 330. Packers 336 can seal an annulus 338 of the well bore 320 above and below the subterranean zone 314. Packers 336 can be mechanical, fluid inflatable or other suitable packers.

As described above, in some embodiments, the $CO_2@Gua_2SO_4$ clathrate particles can be manufactured away from the wellsite (for example, at or near a carbon-dioxide industrial process such as a gas plant) and then transported as solid particles to the wellsite. In the embodiment illustrated in FIG. 3, however, the surface facility at the wellsite includes a clathrate formation facility 370 in which the clathrate particles are formed, encapsulating carbon dioxide within crystalline structures of $CO_2@Gua_2SO_4$ clathrate. The formation facility 370 can include equipment capable of encapsulating the clathrate particles in polymers (e.g., spray-coating system or microencapsulation reactors) or other barriers or coatings described above in reference to FIG. 2. The particles can then be moved or transported to mixing equipment 372 to form a $CO_2@Gua_2SO_4$ fracture slurry 358. Slurry 358 can then be transferred to one or more pump trucks 340 can be coupled to the work string 330. The pump trucks 340 can include mobile vehicles, equipment such as skids or other suitable structures. The pump trucks 340 can pump $CO_2@Gua_2SO_4$ fracture slurry 358 (either alone or in combination with other fluids), down the work string 330 as part of the fracture treatment and generate and maintain the fracture 360. $CO_2@Gua_2SO_4$ fracture slurry 358 can further include a fluid pad, proppants and/or a flush fluid. In some embodiments, as described in further detail below, slurry 358 can further comprise oxidants and/or nanoparticles.

One or more instrument trucks 344 can also be provided at the surface 325. The instrument truck 344 can include a fracture control system 346 and a fracture simulator 347. The fracture control system 346 monitors and controls the fracture treatment. The fracture control system 346 can control the pump trucks 340 and fluid valves to stop and start the fracture treatment as well as to stop and start the pad phase, proppant phase and/or flush phase of the fracture treatment. The fracture control system 346 communicates with surface and/or subsurface instruments to monitor and control the fracture treatment. In some implementations, the surface and subsurface instruments may include surface sensors 348, down-hole sensors 350 and pump controls 352.

Because much fracturing fluid in slickwater fracturing of shales does not flow back to the surface (typically more that 70% of frac fluid is trapped in the formation), the use of $CO_2@Gua_2SO_4$-containing fracture fluids offers a high potential for large-scale carbon sequestration or storage of carbon dioxide in shale formations, in connection with fracturing operations. $CO_2@Gua_2SO_4$-containing mixtures can also be injected into the subsurface via wellbores as part of stand-alone carbon dioxide sequestration operations; i.e., sequestration not directly in connection with subsurface fracturing. Such sequestration operations can be done by injection into, for example, organic-rich formations whereby the sequestering is by absorption of the carbon dioxide in organic matter within the formation subsurface. Sequestration operations can also include injection of $CO_2@Gua_2SO_4$-containing mixtures into salt domes or other subsurface structures that can trap and thereby sequester the carbon dioxide gas resulting from the clathrate decomposition.

In some embodiments, $CO_2@Gua_2SO_4$-containing fracturing fluid can also include oxidizers and/or nanoparticles to further enhance well productivity. Breaking or disintegrating the kerogen/organic matter of created fracture surfaces in shale formations can make those created fractures more permeable and thus enhancing the multi-staged hydraulically fractured extended reach horizontal wells. Adding oxidants to fracturing fluid can significantly enhance well productivity in slickwater fracturing of shale formations. Combining such oxidants and carbon dioxide (for example, by alternating slickwater with very low concertation of sodium bromate and combined with the slickwater fracturing treatment) can to reduce the in-situ hydrocarbon oil/condensate viscosity and enhance oil mobility. Suitable oxidizers include reactive gases such as $O_2$, $O_3$, $N_2O$, NO, and $NO_2$. Other suitable oxidizers for enhancing the porosity and permeability of organic matter in geological formations can be composed of persulfate, perborate, percarbonate, peroxide, oxychlorine, and oxybromine. The oxidizer may also be in the form of a gas or liquid such as $ClO_2$. $ClO_2$ generators are commercially available and the gas can be mixed with water or carbon dioxide on the fly. $ClO_2$ can decompose violently when concentrated so it may be preferable to generate it in situ by known methods. The sodium chlorite/hydrochloric acid most practical in term of handling the chemicals in the field. The oxidizer may be in the form of a salt such as a metal salt, preferably an alkali or alkaline earth metal salt. The peroxide may be an inorganic peroxide salt or may be an organic peroxide.

Breakers when carbon dioxide is used as the fracturing fluid can be added to the fluid composition to promote the breakdown of the gel structure or viscosifying agents that may be present. The breakers work by initiating chemical reactions or degrading the components that contribute to the fluid's viscosity. The specific type and concentration of breakers used in carbon dioxide fracturing depend on factors such as the properties of the fracturing fluid, reservoir conditions, and the desired objectives. Breakers can be chemical compounds, enzymes, or acids that are compatible with the $CO_2@Gua_2SO_4$-containing fracturing fluid.

The inclusion of nanoparticles in fluids injected into shales and other organic-rich formations can alter the surface of rock from oil-wet to water-wet, as well as reducing interfacial tension (IFT), leading to higher oil/condensate production. Introducing such nanoparticles in huff-and-puff treatment for improved oil recovery (IOR) using $CO_2@Gua_2SO_4$-containing fracturing fluid can significantly increase oil production compared to conventional huff-and-puff without nanoparticles. Suitable nanoparticles can include, for example, silica nanoparticles ($SiO_2$) (which can alter rock wettability from oil-wet to water-wet, improving oil mobility), graphene oxide (GO) nanoparticles (which can enhance IFT reduction, increase rock permeability, and improve $CO_2$ solubility in oil), titanium dioxide ($TiO_2$) nanoparticles (which can be effective in reducing interfacial tension and provide photothermal effects in certain cases), magnetic iron oxide ($Fe_3O_4$) particles (which can be used for targeted oil recovery and tracking fluid behavior in reservoirs), and/or zirconium oxide ($ZrO_2$) nanoparticles (which are high-temperature-stable and can enhance fluid retention and rock interaction in deep formations).

Fracturing fluids with a combination of $CO_2$@$Gua_2SO_4$, oxidants, and nanoparticles could be utilized in multiple applications to realize enhancements to well productivity that are greater than any of the three materials alone, and also greater than any combination of any two materials of the three. For example, in some embodiments, for slickwater fracturing or refracturing, a pad of slickwater with $CO_2$@$Gua_2SO_4$CO2 clathrate particles is injected, followed by slickwater with oxidants and nanoparticles. In some embodiments for a huff-n-puff treatment in a shale well, conventional cycles of injection and well shut-in can be performed, with the injection cycles comprising mixtures of nanoparticles with $CO_2$@$Gua_2SO_4$ the particles, rather than pure/supercritical carbon dioxide fluid.

In some embodiments, the concentration of additives such as oxidants and/or nanoparticles relative to the amount carbon dioxide released from the clathrate particles can be, for example, 0.00001 weight percent (wt %) additives to 10 wt % released carbon dioxide, 0.0001 wt % additives to 5 wt % released carbon dioxide, or 0.001 wt % additives to 1 wt %. released carbon dioxide, or another suitable relative concentration. In some embodiments, the concentration of pre-dissolved treatment chemical relative to its solvent can be, for example, from 0.01 wt % treatment chemicals to 70 wt % solvent, 0.1 wt % treatment chemicals to 60 wt %, solvent, 1 wt % treatment chemicals to 50 wt % solvent, or another suitable relative concentration. In some embodiments, the concentration of supplementary additives (for example, surfactants or emulsifiers or controlled-release organic, inorganic, or inorganic-organic moieties) may range from 0.001 wt % to 5 wt %, 0.01 wt % to 2 wt %, or 0.1 wt % to 1 wt %, or another suitable range.

The term "uphole" as used herein means in the direction along a wellbore from its distal end towards the surface and through the wellhead, and "downhole" as used herein means the direction through the wellhead and along the wellbore from the surface towards the wellbore's distal end. A downhole location means a location along a wellbore downhole of the surface.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate. Accordingly, the previously described example implementations do not define or constrain the present disclosure. Other changes, substitutions, and alterations are also possible without departing from the spirit and scope of the present disclosure.

EXAMPLES

In a first aspect, a method for well operations includes disposing into a wellbore drilled into a subterranean zone a mixture comprising guanidinium-based clathrate particles, and flowing the mixture downhole through the wellbore and thence into the subterranean zone, thereby placing in the subterranean zone carbon dioxide released from decomposition of the clathrate.

In a second aspect in accordance with the first aspect, prior to disposing the mixture, at least a portion of the guanidinium-based clathrate particles are encapsulated with a coating configured to delay the decomposition of the particles as the mixture is flowed downhole and into the subterranean zone.

In a third aspect in accordance with the second aspect, the coating is configured to delay the decomposition under wellbore conditions of at least 100 degrees Celsius.

In a fourth aspect in accordance with the second or third aspects, the coating comprises a polymer coating.

In a fifth aspect in accordance with any of the first to fourth aspects, prior to disposing the mixture, at least a portion of the guanidinium-based clathrate particles are doped with stabilizing ions.

In a sixth aspect in accordance with any of the first to fifth aspects, the mixture comprising the guanidinium-based clathrate particles is a fracturing slurry and the method further includes fracturing the subterranean zone with the fracturing slurry.

In a seventh aspect in accordance with any of the first to sixth aspects, the mixture further includes an oxidizer.

In an eighth aspect in accordance with any of the first to seventh aspects, the mixture further includes nanoparticles.

In a ninth aspect in accordance with any of the first to eighth aspects, the method further includes sequestering in the subterranean zone the carbon dioxide placed in the subterranean zone.

In a tenth aspect in accordance with any of the first to ninth aspects, the subterranean zone includes or is a kerogen-rich formation.

In an eleventh aspect in accordance with any of the first through tenth aspects, the sequestering is at least partially by absorption of the carbon dioxide in organic matter within the formation.

In a twelfth aspect, a fracturing slurry includes a fluid configured for hydraulic fracturing of a subterranean zone and guanidinium-based clathrate particles.

In a thirteenth aspect in accordance with the twelfth aspects, the guanidinium-based clathrate particles are encapsulated with a coating, the coating configured to delay decomposition of the clathrate as the fracturing slurry is flowed under specified wellbore conditions.

In a fourteenth aspect in accordance with the thirteenth aspect, the specified wellbore conditions comprise a wellbore temperature of at least 100 degrees Celsius.

In a fifteenth aspect in accordance with the thirteenth or fourteenth aspects, the coating is at least partially impermeable to wellbore fluids.

In a sixteenth aspect in accordance with any of the thirteenth to fifteenth aspects, the coating is or includes a polymer coating.

In a seventeenth aspect in accordance with any of the thirteenth to sixteenth aspects, the coating is or includes a polymer-nanoparticle composite.

In an eighteenth aspect in accordance with any of the thirteenth to seventeenth aspects, the coating is or includes wax.

In a nineteenth aspect in accordance with any of the thirteenth to eighteenth aspects, the coating is or includes resin.

In a twentieth aspect in accordance with any of the twelfth to nineteenth aspects, the guanidinium-based clathrate particles are doped with stabilizing ions.

What is claimed is:

1. A method of well operations comprising:

into a wellbore drilled into a subterranean zone, disposing a mixture comprising guanidinium-based clathrate particles, wherein the guanidinium-based clathrate particles are formed through co-crystallization of carbon dioxide with guanidinium sulfate; and flowing the mixture downhole through the wellbore and thence into the subterranean zone, thereby placing in the subterranean zone carbon dioxide released from decomposition of the clathrate.

2. The method of claim 1, wherein, prior to disposing the mixture, at least a portion of the guanidinium-based clathrate particles are encapsulated with a coating configured to delay the decomposition of the particles as the mixture is flowed downhole and into the subterranean zone.

3. The method of claim 2, wherein the coating is configured to delay the decomposition under wellbore conditions of at least 100 degrees Celsius.

4. The method of claim 2, wherein the coating comprises a polymer coating.

5. The method of claim 1, wherein, prior to disposing the mixture, at least a portion of the guanidinium-based clathrate particles are doped with stabilizing ions.

6. The method of claim 1, wherein:

the mixture comprising the guanidinium-based clathrate particles is a fracturing slurry; and the method further comprises fracturing the subterranean zone with the fracturing slurry.

7. The method of claim 1, wherein the mixture further comprises an oxidizer.

8. The method of claim 1, wherein the mixture further comprises nanoparticles.

9. The method of claim 1, further comprising sequestering, in the subterranean zone, the carbon dioxide placed in the subterranean zone.

10. The method of claim 9, wherein the subterranean zone comprises a kerogen-rich formation.

11. The method of claim 10, wherein the sequestering is at least partially by absorption of the carbon dioxide in organic matter within the formation.

* * * * *